(12) United States Patent
Fukuhara et al.

(10) Patent No.: US 6,647,636 B2
(45) Date of Patent: Nov. 18, 2003

(54) METHOD FOR MEASURING ROAD SURFACE LONGITUDINAL PROFILE

(75) Inventors: Toshihiko Fukuhara, Ichinomiya (JP); Hisayoshi Sato, Setagaya-Ku (JP); Akihiko Yoneya, Toyota (JP)

(73) Assignee: Sunway Co., Ltd., Ichinomiya (JP)

(*) Notice: Subject to any disclaimer, the term of this patent is extended or adjusted under 35 U.S.C. 154(b) by 0 days.

(21) Appl. No.: 10/343,421

(22) PCT Filed: Jul. 27, 2001

(86) PCT No.: PCT/JP01/06513
§ 371 (c)(1), (2), (4) Date: Jan. 30, 2003

(87) PCT Pub. No.: WO02/10682
PCT Pub. Date: Feb. 7, 2002

(65) Prior Publication Data
US 2003/0145477 A1 Aug. 7, 2003

(51) Int. Cl.[7] .................................. G01B 1/00
(52) U.S. Cl. ............... 33/521; 33/501.02; 33/501.03; 33/546; 33/533; 33/121
(58) Field of Search ............... 33/521, 501.02, 33/501.03, 546, 551, 553, 554, 533, 121, 122, 123, 124, 772, 773

(56) References Cited

U.S. PATENT DOCUMENTS

| | | | |
|---|---|---|---|
| 3,038,332 A | | 6/1962 | Grossmann |
| 3,594,912 A | | 7/1971 | Sauterel |
| 4,858,329 A | | 8/1989 | Manor |
| 5,065,618 A | * | 11/1991 | Hodges, Sr. et al. .......... 33/521 |
| 5,107,598 A | | 4/1992 | Woznow et al. |
| 5,535,143 A | * | 7/1996 | Face .......................... 33/551 |
| 5,774,374 A | * | 6/1998 | Scott et al. .................. 33/521 |
| 6,035,542 A | | 3/2000 | Woznow et al. |
| 6,161,429 A | * | 12/2000 | Marvel et al. ................ 33/521 |
| 6,508,008 B2 | * | 1/2003 | Suzuki et al. ................ 33/521 |
| 6,532,672 B1 | * | 3/2003 | Gottlieb ....................... 33/124 |
| 6,550,151 B2 | * | 4/2003 | Airey et al. .................. 33/320 |

FOREIGN PATENT DOCUMENTS

| | | |
|---|---|---|
| JP | 59-202002 | 11/1984 |
| JP | 02-173514 | 7/1990 |
| JP | 03-2808 | 1/1991 |
| JP | 05-113328 | 5/1993 |
| JP | 06-265353 | 9/1994 |

OTHER PUBLICATIONS

Kumazawa et al, US patent application Publication No. US 2002/0007562, Jan. 24, 2002, see entire document.*

* cited by examiner

Primary Examiner—Christopher W. Fulton
Assistant Examiner—Amanda J Hoolahan
(74) Attorney, Agent, or Firm—Burr & Brown

(57) ABSTRACT

A measurement block 10 which moves longitudinally on a road surface includes disk-shaped first, second, and third rollers 11, 12, and 13 having the same outer diameter with a predetermined spacing set therebetween, a first coupling rod 14 which is mounted on rotary shafts of the first and second rollers in a revolving manner, a second coupling rod 15 which has the same length as the first coupling rod and which is mounted on rotary shafts of the second and third rollers in a revolving manner, a distance measurement device 16 which is mounted on the rotary shaft of the first or second roller, and a rotary encoder 18 which is mounted on the second coupling rod to detect an angle between the first and second coupling rods. Each time the measurement block moves by a length between the first and second coupling rods, the angle between the first and second coupling rods is detected by the angle detection means to thereby create a longitudinal profile based on the detected value.

4 Claims, 5 Drawing Sheets

METHOD FOR MEASURING ROAD SURFACE LONGITUDINAL PROFILE

TECHNICAL FIELD

The present invention relates to a longitudinal road surface profile measurement method for surveying flatness of a plane having irregularities such as a road surface of a road.

BACKGROUND ART

Conventionally, as a method for measuring straightness of an object under measurement on a straight line, such a method (hereinafter called sequential-two-points method) has been known for, as disclosed in Japanese Patent Publication No.61-33364 (see FIG. 11), arranging two displacement gages 6 and 7 with a short pitch therebetween toward an object-under-measurement 3 on a slide 4 movably engaged to a straight guide 5 in parallel with the object-under-measurement 3, feeding in one direction the slide 4 over an entire length of a measurement length by the pitch each time, to measure a distance between the two displacement gages 6 and 7 and the object-under-measurement 3 using the displacement gages 6 and 7 respectively at each position, and processing resultant data to thereby obtaining straightness of the straight guide and the object-under-measurement. By this sequential-two-points method, it is possible to obtain straight geometry curves of both the straight guide and the object-under-measurement independently of each other to thereby accurately survey the straightness of the object-under-measurement even if the guide is not straight, which is very convenient.

By this sequential-two-points method, however, it is necessary to always hold in parallel with each other two displacement gages when they are mounted in a vehicle to measure a longitudinal road surface profile, thus suffering from a problem that the measurement is very complicated. Moreover, a recent road employs pavement with drainage and sound absorbance having fine irregularities on a surface thereof, so that it is necessary by the sequential-two-points method to pay attention so that a probe of the displacement gages may not be affected by these irregularities. There is also an auto-collimator method available for moving a reflecting mirror to detect an inclination angle at a movement position and processing it to obtain a longitudinal profile. The auto-collimator method, however, requires much labor in movement of the reflecting mirror, thus suffering from a problem that the measurement is very complicated.

To solve these problems, the present invention has been developed, and it is an object of the present invention to provide a longitudinal road surface profile measurement method that can survey longitudinal flatness of a road surface of a road easily and accurately.

DISCLOSURE OF THE INVENTION

To achieve the object, a first aspect of the present invention provides a longitudinal road surface profile measurement method for surveying longitudinal flatness of a road surface by longitudinally moving a measurement vehicle on a road, comprising the steps of: arranging first, second, and third disk-shaped rollers having the same outer diameter so that the rollers have a predetermined spacing therebetween on the same straight line and rotate in the same straight-line direction; using a measurement block constituted of a first predetermined-length coupling rod which is mounted on rotary shafts of the first and second rollers to couple the first and second rollers in a revolving manner, a second coupling rod which has the same length as the first coupling rod and which is mounted on rotary shafts of the second and third rollers to couple the second and third rollers in a revolving manner, distance measurement means which measures a movement distance of the rollers, and angle detection means which detects a displacement angle by which the first and second coupling rods have revolved from a straight state thereof, to elastically couple the measurement block to a measurement vehicle with a coupling member so that the measurement block may be urged against the road surface; detecting, using the angle detection means, a displacement angle between the first and second coupling rods each time the measurement block moves by one pitch, which is a center-to-center distance between the rollers, in a longitudinal direction of the road surface as the measurement vehicle moves; and creating a longitudinal profile of the road surface based on detected angle values.

In this configuration of the first aspect of the present invention, the measurement block is constituted of the disk-shaped first, second, and third rollers having the same outer diameter with a predetermined spacing set therebetween and the first and second coupling rods which couples these rollers in a revolving manner, so that each time the measurement block moves by the one pitch in a longitudinal direction of the road, positions where the first and second rollers were placed before the movement are occupied by the second and third rollers respectively after the movement. Therefore, each time such measurement block moves by the one pitch, a displacement angle between the first and second coupling rods can be detected by the angle detection means to thereby use an inclination angle at a measurement starting position as a longitudinal profile initial value in order to sequentially obtain a change in angle of the first and second coupling rods based on this value, thus obtaining a longitudinal road surface profile automatically and sequentially. In such a manner, this sequential-two-angles method is so called because it uses a measurement block constituted of first, second, and third rollers coupled by first and second coupling rods to enables, from a new viewpoint, measurement which has been possible by means of a sequential-three-points method of using three displacement gages arranged in parallel with each other based on the conventional sequential-two-points method. As a result, by the present invention, two angles can be detected sequentially to thereby create longitudinal road surface profile easily and accurately as compared with the conventional sequential-two-points method or the auto-collimator method. Moreover, by using roller in such a manner, it is possible to accurately measure flatness of a road surface as a whole without being affected by fine irregularities even if the road surface has them as in the case of draining pavement.

A second aspect of the present invention provides a method comprising the steps of: moving, in a unit of a predetermined spacing, a measuring instrument constituted of three probes aligned in parallel with each other with a predetermined spacing therebetween along a longitudinal profile according to the above-mentioned claim 1 in a condition where probes on both sides of the measuring instrument are kept in contact with the longitudinal profile; obtaining a deflection dimension of an intermediate probe of the measuring instrument with respect to the longitudinal profile for each of the movement units; and calculating a standard deviation of a measurement value of the deflection dimension to thereby provide flatness of a road surface.

In the second aspect of the present invention, the measuring instrument constituted of the three probes aligned in parallel with each other with the predetermined spacing therebetween can be used to easily obtain flatness of a road surface based on a longitudinal profile obtained by the measurement method described in claim 1. Preferably, software processing by use of a microcomputer is conducted to obtain a precise result rapidly.

A third aspect of the present invention provides a method comprising the steps of: moving a measuring instrument constituted of a deadweight having a predetermined weight attached to one end of a linear spring material having a predetermined spring constant longitudinally at a predetermined speed in a condition where the linear spring material is poised as erected with the deadweight as arranged at an upper end thereof and a lower end thereof is kept in contact with a longitudinal profile described in the first aspect of the present invention; integrating longitudinal displacements of the deadweight during the movement; and calculating an integrated value of the displacements to provide flatness of the road surface.

This flatness evaluation method is referred to as the International Roughness Index (iRi) method.

In the third aspect of the present invention, in accordance with the iRi, it is possible to obtain practical roughness of a road surface as viewed from a vehicle travelling on a road. A precise result of the iRi can be obtained rapidly and accurately also preferably by conducting software processing by use of a microcomputer.

A fourth aspect of the present invention provides a longitudinal road surface profile measurement method for surveying a longitudinal irregularity condition in a road surface while moving a measurement vehicle longitudinally on a road, comprising the steps of: arranging first, second, and third disk-shaped rollers having the same outer diameter so that the rollers have a predetermined spacing therebetween on the same straight line and rotate in the same straight-line direction; using a measurement block constituted of a first predetermined-length coupling rod which is mounted on rotary shafts of the first and second rollers to couple the first and second rollers in a revolving manner, a second coupling rod which is mounted on rotary shafts of the second and third rollers to couple the second and third rollers in a revolving manner, distance measurement means which measures a movement distance of the rollers, and angle detection means which detects a displacement angle by which the first and second coupling rods have revolved from a straight state thereof, to elastically attach the measurement block to a measurement vehicle with a coupling member so as to be urged against the road surface; deciding a plurality of survey positions obtained as a result of dividing into a plurality of pitches a reference distance which is defined as a center-to-center dimension between the first and third rollers in a condition where the first and second coupling rods are in a straight state; each time the leading roller reaches the survey positions sequentially in an advancing direction in which the measurement block moves over the reference distance in a longitudinal direction of the road surface, detecting a displacement angle between the first and second coupling rods at each of the survey positions using the angle detection means; calculating height data of the road surface at each of the survey positions using a filter operation method based on the detected displacement angle value obtained by the angle detection means and known height data at each of the immediately preceding survey positions measured by the measurement block, to obtain a unit road surface profile over the reference distance; and integrating the consecutive unit road surface profiles in the entire longitudinal direction of the road surface, to create a longitudinal profile of the road surface.

In the fourth aspect of the present invention, the measurement block starts moving from a starting point by as much as a distance that corresponds to the reference distance in the longitudinal direction of the road surface. In this case, each time the leading roller reaches each of the predetermined survey positions within the reference distance sequentially, a displacement angle between the first and second coupling rods at each of the survey positions is detected by the angle detection means. Based on the detected value obtained by this angle detection means and known height data at each of the survey positions measured by the measurement block at the survey position immediately preceding the current angle detection position, height data can be calculated at each of the survey positions sequentially using the filter operation method. By integrating the calculated data measured at each of the survey positions, a road surface profile within the reference distance can be accurately obtained for each of the survey positions having a short pitch therebetween. The unit road surface profiles thus obtained within the reference distance can be integrated consecutively in the entire longitudinal direction of the road surface, to obtain a precise longitudinal profile of the entire road surface.

As a result, according to the fourth aspect of the present invention, precise data of irregularities of a road surface can be obtained for each of short pitches between the survey positions into which the reference distance is divided, so that it is possible to accurately detect irregularities in the entire road surface including small irregular objects such as a structure joint, a concrete bond, and a pot-hole which are present on the entire road surface as a whole. Furthermore, the road surface profile thus obtained can be utilized in road step management etc.

The following will describe a method using an Infinite Impulse Response Filter (hereinafter abbreviated as IIR filter) as one example of the filter operation method.

It is supposed, as shown in FIG. 8, that the first and second coupling rods 14 and 15 (which have the same length in this case) are in a straight state, a reference distance 50 (in an arbitrary unit), which is a center-to-center distance between the first and third rollers 11 and 13, is divided into, for example, 50 equal pitches, and each survey position is i through (i–50). If each height of the road surface that corresponds to each of the survey positions is y(i) through y(i–50), an angle u(i) between the first and second coupling rods 14 and 15 is represented by the following equation 1:

$$u(i) = \frac{1}{a}(y(i) - 2y(i-25) + y(i-50)) \quad \text{(Equation 1)}$$

where $\lceil a \rfloor$ is a constant.

Equation 1 can be transformed into the following equation 2 represented by y(i):

$$y(i) = 2y(i-25) - y(i-50) + au(i) \quad \text{(Equation 2)}.$$

By conducting z-transformation on the above-mentioned equation 1, the following equation 3 is given. Furthermore, Equation 3 can be transformed into the following equation 4 represented by Y(z):

$$U(z) = \frac{1}{a}(1 - 2z^{-25} + z^{-50})Y(z) \quad \text{(Equation 3)}$$

$$Y(z) = \frac{az^{50}}{z^{50} - 2z^{25} + 1} U(z) \quad \text{(Equation 4)}$$

Equation 4 is developed with its denominator as assumed to be D(z), into Equation 5. Furthermore, if Equation 5 is expressed by a product of $D_1(z)$ and $D_2(z)$, $D_1(z)$ and $D_2(z)$ can be summarized as given in Equation 6:

$$D(z) = z^{50} - 2z^{25} + 1 = (z-1)^2 \cdot (z^{48} + 2z^{47} + \ldots + 24z^{25} + 25z^{24} + 24z^{23} + \ldots + 1) \quad \text{(Equation 5)}$$

$$D_1(z) = (z-1)^2 \quad \text{(Equation 6)}$$

$$D_2(z) = z^{48} + 2z^{47} + \ldots + 24z^{25} + 25z^{24} + 24z^{23} + \ldots + 1$$
$$= \prod_{i=1}^{24} \left(z - e^{j\frac{2\pi}{25}i}\right)^2$$
$$j = \sqrt{-1}$$

A solution of D(z)=0, that is, a pole Pk of the filter, corresponds to two 1s and two of each $e^{[j(2\pi/25)1]}$ (i=1 to 25), that is, a sum of irregularities between 1 and 25. The behavior of this pole Pk is represented by (i, i(Pk)$^i$), so that any pole has an absolute value of 1 and an output of the filter having D(z) as its denominator diverges.

Accordingly, by conducting substitution on the pole as given by the following equation 7, the filter output can be converged:

$$\text{poles}: 1 \to P \quad 0 < P < 1 \quad \text{(Equation 7)}$$
$$e^{j\frac{2\pi}{25}i} \to Wa \cdot e^{j\frac{2\pi}{25}i} \quad 0 < Wa < 1$$

By replacing the poles of the above-mentioned $D_1(z)$ and $D_2(z)$ with each other based on Equation 7, $D_1(z)$ and $D_2(z)$ are obtained as shown in Equations 8 and 9:

$$D_1'(z) = (z-P)^2 = z^2 - 2Pz - P^2 \quad \text{(Equation 8)}$$

$$D2'(z) = \prod_{i=1}^{24} \left(z - Wa \cdot e^{j\frac{2\pi}{25}i}\right)^2 \quad \text{(Equation 9)}$$
$$= z^{48} + 2waz^{47} + \ldots + 24wa^{23}z^{25} + 25wa^{24}z^{24} + 24wa^{26}z^{23} + \ldots + wa^{48}$$

Furthermore, $D_1(z)$ and $D_2(z)$ can be multiplied by each other, D(z) to give D(z) as shown in Equation 10:

$$D'(z) = D_1'(z) \cdot D_2'(z) = z^{50} + C_1 z^{49} + C_2 z^{48} + \ldots + C_{49}Z + C_{50} \quad \text{(Equation 10)}$$

where $C_1$ through $C_{50}$ are constants.

D(z) given above can be replaced by D(z) in the above-mentioned Equation 4 to obtain the following Equation 11, which can be represented by U(z) to provide Equation 12:

$$Y(z) = \frac{az^{50}}{D'(z)} \cdot U(z) \quad \text{(Equation 11)}$$

$$U(z) = \frac{1}{a} \cdot D'(z) \cdot z^{-50} \cdot Y(z) \quad \text{(Equation 12)}$$

By conducting inverse z-transformation on this equation 12, Equation 13 can be obtained which indicates a displacement angle u(i) between the first and second coupling rods 14 and 15 at the survey position i. Furthermore, Equation 13 can be represented by y(i) to provide Equation 13 indicating y(i), which indicates a road surface height at the survey position i:

$$u(i) = \frac{1}{a}(y(i) + C_1 y(i-1) + C_2 y(i-2) + \ldots + C_{50} y(i-50)) \quad \text{(Equation 13)}$$

$$y(i) = C_1 y(i-1) - C_2 y(i-2) - \ldots - C_{50} y(i-50) + au(i) \quad \text{(Equation 14)}$$

That is, by employing the IIR Method, an operation equation for calculating a longitudinal road surface profile is given in Equation 14. By dividing the reference distance into a plurality of small pitches and using this operation equation, it is possible to obtain data of the height at each of the survey positions from the displacement angle u(i) and known height data of each of the immediately preceding survey positions of the measurement block.

THE BEST EMBODIMENTS FOR WORKING THE INVENTION

Figure 1:
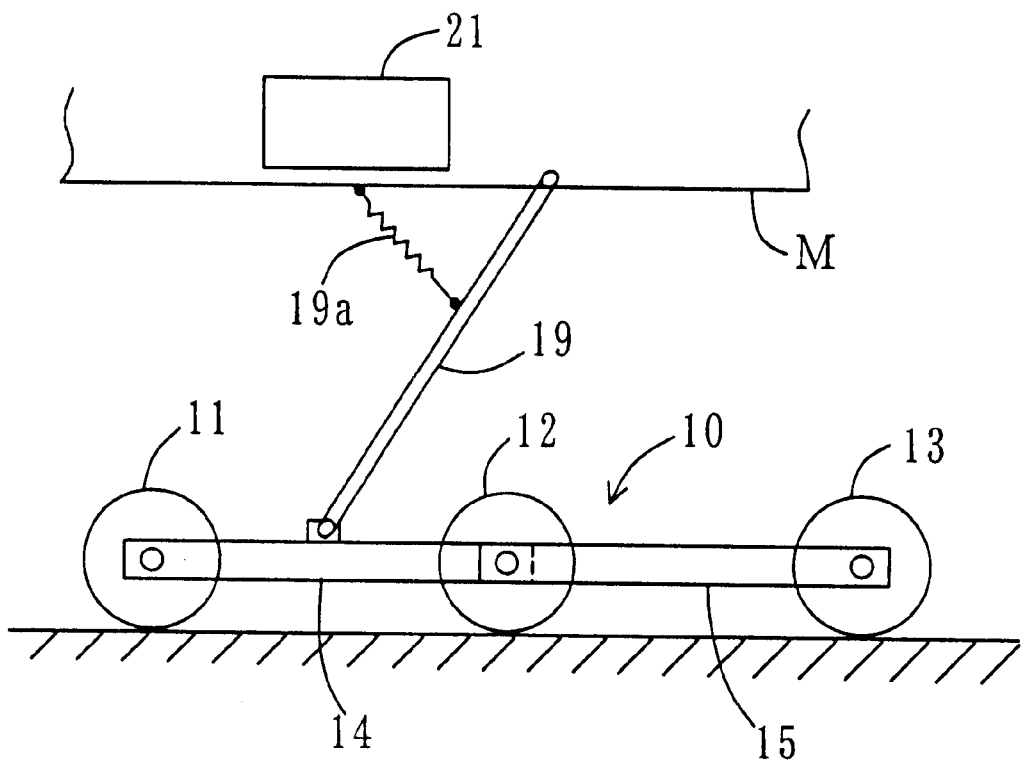
FIG. 1 is a front view for outlining a measurement block mounted to a measurement vehicle in order to measure flatness of a road surface of a road according to one embodiment of the present invention.
Figure 2:
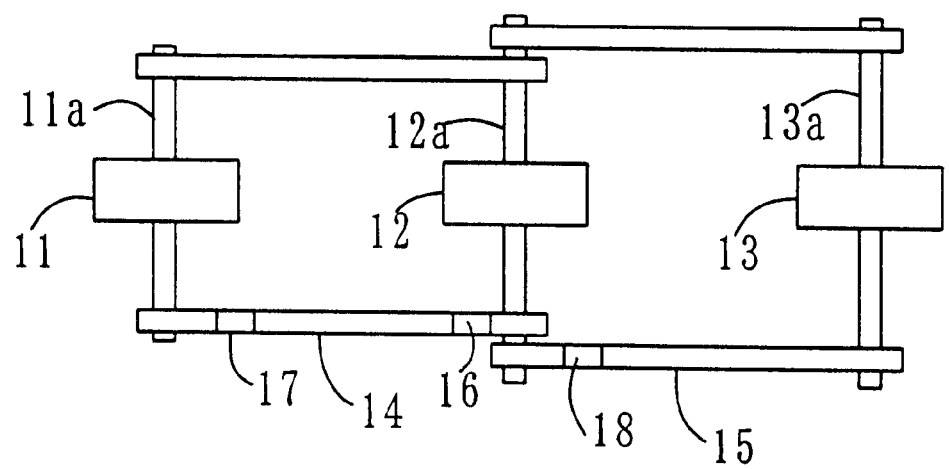
FIG. 2 is a plan view for outlining the measurement block.

The following will describe one embodiment of the present invention with reference to drawings, specifically to FIGS. 1 and 2 for showing an outlined configuration of a measurement block 10 used in a method for surveying a longitudinal profile of a road surface D of a road according to the present embodiment in a front view and a plan view respectively. It is to be noted that a longitudinal profile of a road D is surveyed at such a position where a left wheel of a vehicle passes by as to be called an out-wheel path (OWP) where a road surface is worn most. It is found that 70–80% of the vehicles pass on this out-wheel path of the road.

As shown in FIG. 1, the measurement block 10 has three disk-shaped rear, intermediate, and front rollers of first, second, and third rollers 11, 12, and 13 in an advancing direction. The rollers 11, 12, and 13 are each made of hard rubber or plastic and arrayed on the same straight line and in the same straight direction of revolution. The outer diameter of the first, second, and third rollers 11, 12, 13 is 10 cm in the present embodiment. The first, second, and third rollers 11, 12, and 13 have rotary shafts 11a, 12a, and 13a, fixed therethrough respectively. On both sides of the rotary shafts 11a and 12a of the respective first and second rollers 11 and 12 are there fixed a pair of elongated plate-shaped first coupling rods 14 in such a manner that the rotary shafts 11a and 12a can revolve. Furthermore, on both sides of the rotary shafts 12a and 13a of the respective second and third rollers 12 and 13 are there fixed a pair of elongated plate-shaped second coupling rods 15 in such a manner that the rotary shafts 12a and 13a can revolve. In the present embodiment, the distance between the rollers 11 and 12 and that of the rollers 12 and 13 are both set to 25 cm, which is a measurement pitch, so that when the rollers 11, 12, and 13 are aligned on a straight line, a reference distance of a center-to-center dimension between the first roller 11 and the third roller 13 is 50 cm.

The first coupling rod 14 (or the second coupling rod 15) is mounted with a distance measuring device 16 for detecting a moving distance of the measurement block based on the number of revolutions of any one of the rollers 11, 12, and 13. Furthermore, the first coupling rod 14 is mounted with an inclinometer 17 for detecting an initial angle $\theta_B$ of the first coupling rod 14. Moreover, the second coupling rod 15 (or the first coupling rod 14) is mounted with a rotary encoder 18 as angle detection means for detecting a displacement angle $\theta$ by which the first and second coupling rods 14 and 15 have revolves from a straight state.

The measurement block 10 is coupled to a measurement vehicle M with a coupling support rod 19 which is attached to the first coupling rod 14. The coupling support rod 19 is attached to the first coupling rod 14 and the measurement vehicle M so that it may be revolved with respect to each of these. Furthermore, the coupling support rod 19 is elastically coupled at its length-directional middle position to the measurement vehicle M with a coil spring 19a in such a manner that the coil spring 19a may urge the measurement block 10 in such a direction as to slightly press it against the road. Accordingly, the measurement block 10 can move in a condition where it is slightly pressed against the road surface as the measurement vehicle M moves.

The measurement vehicle M is provided with a control device 21 comprised of a computer. Into a storage portion of the control device 21 is there input a setting of 25 cm, which is a measurement pitch, that corresponds to a distance between the first and second rollers 11 and 12 and that between the second and third rollers 12 and 13. Furthermore, the storage portion of the control device 21 stores therein a spacing value (measurement pitch) of 1 cm between survey positions obtained by dividing the above-mentioned reference distance into 50 equal pitches and also the operation equation of the above-mentioned equation 14. Moreover, to the input side of the control device 21 are there connected the above-mentioned distance measuring device 16, the inclinometer 17, and the rotary encoder 18, while to the output side thereof is there connected a recording device such as a printer (not shown).

The following will describe measurement of irregularities in a road by use of a measurement system of a first embodiment.

Figure 3:
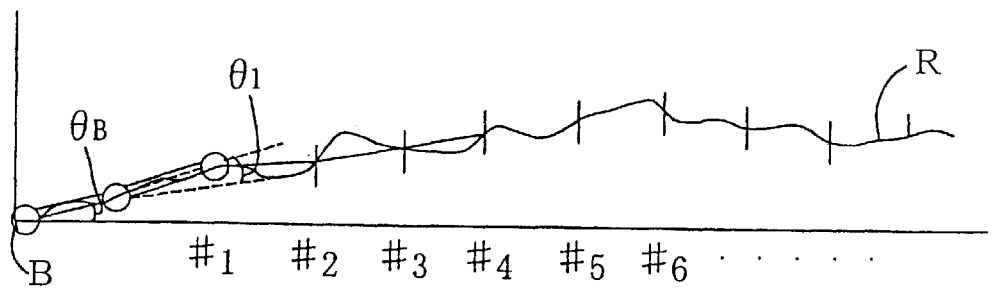
FIG. 3 is an illustration for explaining a process for measuring irregularities in a road surface using a measurement block.

As shown in FIG. 3, a measurement block 10 is also moved by advancing a measurement vehicle M forward (longitudinally) in a condition where the measurement block 10 is aligned with an OWP position on a road and a first roller 11 is set to a reference position B. Correspondingly, results of measurement by a distance measuring device 16, an inclinometer 17, and a rotary encoder 18 are input to a control device 21. In this case, based on a measurement pitch stored in a storage portion of the control device 21, positions of a third roller 13 and a second roller 12 before the movement are occupied by the second roller 12 and the first roller 11 respectively after the movement each time the measurement block 10 moves by 25 cm, so that results of measurement by the distance measuring device 16 and the rotary encoder 18 at these positions are stored in the control device 12. In such a manner, for each movement distance of 25 cm, a revolution angle $\theta$ of a second coupling rod 15 with respect to a first coupling rod 14 can be obtained sequentially.

Figure 4:
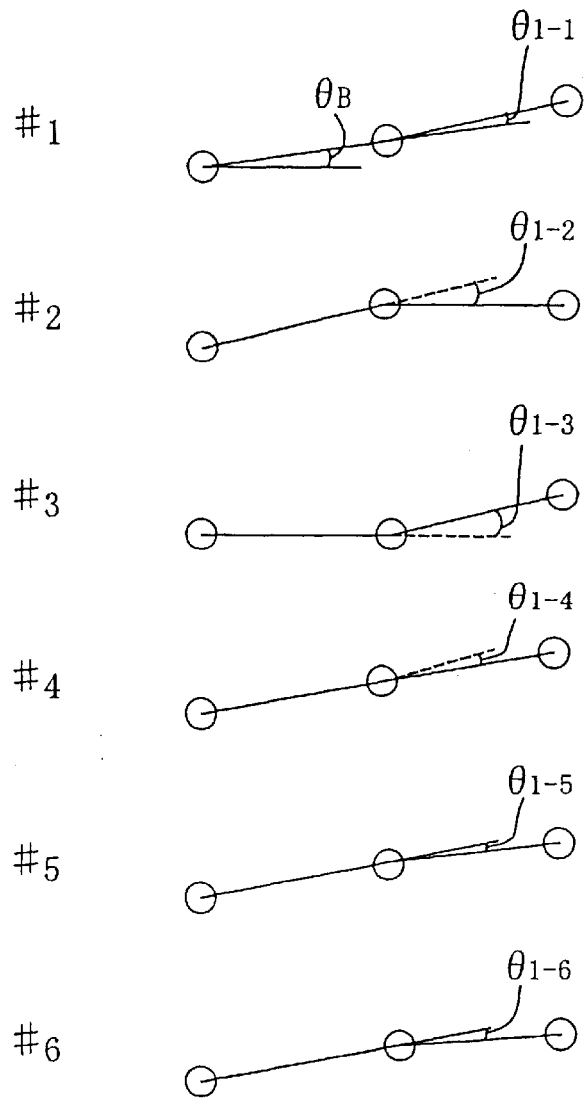
FIG. 4 is an illustration for schematically explaining a state at each measurement points of the measurement block.
Figure 5:
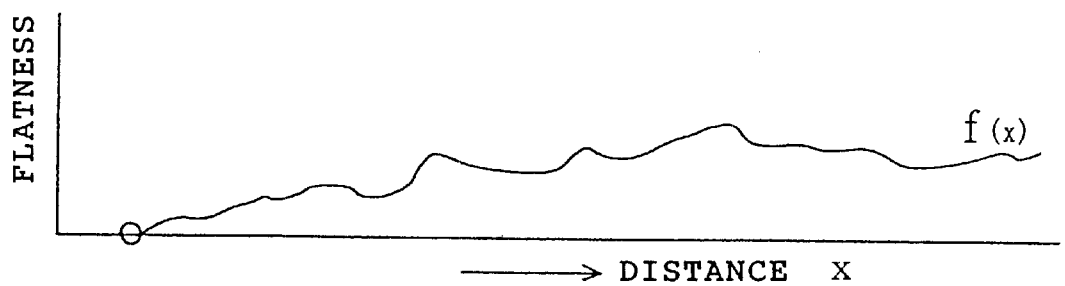
FIG. 5 is an illustration for explaining a measurement result by the measurement block as analyzed and shown in a road surface geometry.

As shown in FIG. 4, an initial angle $\theta_B$ of the first coupling rod 14 at initial position #1 of the measurement block 10 is obtained beforehand, after which a revolution angle $\theta_{1-1}$ of the second coupling rod 15 with respect to the first coupling rod 14 is obtained as a survey value of the rotary encoder 18. Next, at position #2 to which the measurement block 10 has moved by one measurement pitch, a revolution angle $\theta_{1-2}$ of the second coupling rod 15 with respect to the first coupling rod 14 is obtained as a survey value of the rotary encoder 18. Hereinafter similarly, at positions #3, #4, #5, . . . to which the measurement block 10 has moved by each one measurement pitch, respective revolution angles $\theta_{1-3}, \theta_{1-4}, \theta_{1-5}, \ldots$ of the second coupling rod 15 with respect to the first coupling rod 14 are obtained as a survey value of the rotary encoder 18. The one-pitch distance of 25 cm and the data of the angle $\theta$ undergo computer processing to thereby provide a correct longitudinal profile f(x) of the OWP of the road as shown in FIG. 5. That is, by using the sequential-two-angles method of sequentially detecting the revolution angle of the second coupling rod 15 with respect to the first coupling rod, it is possible to create a precise longitudinal profile of the road surface easily without complications of, for example, keeping displacement gages in parallel with each other as in the case of the conventional sequential-two-points method.

The following will describe a method for obtaining flatness of the above-mentioned longitudinal profile.

Figure 6:
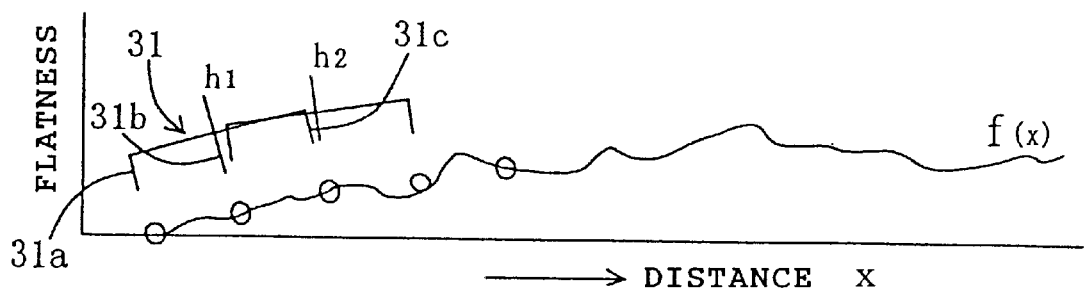
FIG. 6 is an illustration for explaining a method for analyzing flatness of a road surface using the result of FIG. 5.

According to a first method, as shown in FIG. 6, by moving a measuring instrument 31 constituted of three probes 31a, 31b, and 31c aligned in parallel to each other with a predetermined spacing t (for example, 3 m) therebetween in a unit of the predetermined spacing t along a longitudinal profile f(x) obtained by the above-mentioned method in a condition where the probes 31a and 31c on the respective two sides are kept in contact with the longitudinal profile f(x), a deflection dimension hx of the intermediate probe 31b of the measuring instrument 31 with respect to the longitudinal profile f(x) is obtained for each of the movement units to calculate a standard deviation a of the deflection dimension hx for each movement unit, thus providing flatness of the road surface. It is to be noted that normally such measurement processing is conducted utilizing a computer, thus enabling to obtain a result rapidly and accurately.

Figure 7:
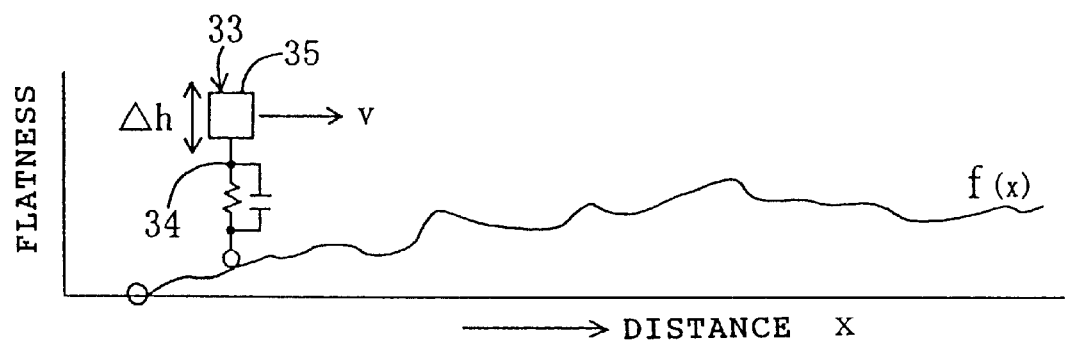
FIG. 7 is an illustration for explaining a method for analyzing flatness of a road surface by the iRi method using the result of FIG. 5.

Furthermore, as a second method for obtaining flatness of a longitudinal profile, a method by use of an International Roughness Index (iRi) is described as follows. As shown in FIG. 7, by longitudinally moving at a predetermined speed v a measuring instrument 33 constituted of a deadweight 35 having a predetermined weight attached to one end of a linear spring material 34 having a predetermined spring constant in a condition where the linear spring material 34 is poised as erected with the deadweight 35 as arranged at an upper end thereof and a lower end thereof is kept in contact with the longitudinal profile f(x), longitudinal displacements of the deadweight during the movement are integrated to calculate an integrated value, thus providing flatness of the road surface. A method for obtaining an iRi value is normally conducted by software processing by use of a microcomputer, thus enabling to provide a precise result rapidly. By this iRi method, it is possible to obtain practical roughness of a road surface as viewed from a vehicle travelling on a road.

The following will describe measurement of irregularities in a road by use of a measurement system according to a second embodiment.

Figure 8:
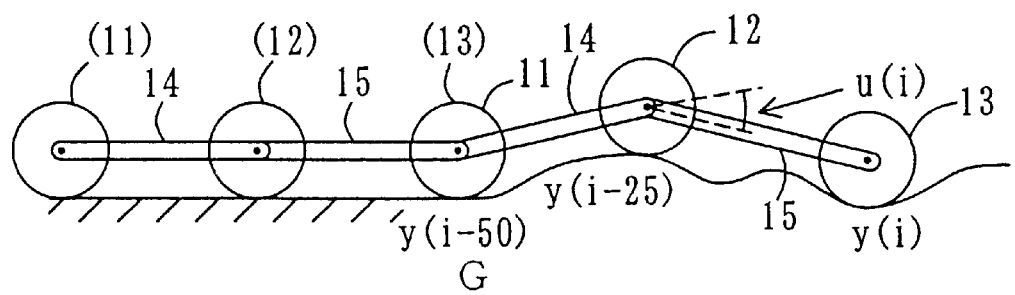
FIG. 8 is an illustration for explaining a method for measuring irregularities in a road surface over a reference distance using the measurement block.

A reference distance of 50 cm, which is a center-to-center distance between a first roller 11 and a third roller 13, is divided into 50 equal pitches to thereby provide survey positions of i through (i-50)cm. As shown in FIG. 8, a measurement block 10 is mounted in an advancing direction at an initial position on a flat road and further aligned with an OWP position on the road in a condition where the leading third roller 13 is set to a starting point G. At the initial position, angle u(0)= and height data y(0)=, . . . , y(−25)=, . . . , y(−50)=0. In this case, height data at the initial position is assumed to be 0 in order to use it as a reference value.

When a measurement vehicle M is moved forward (longitudinally), the measurement block 10 is also moved. When the measurement block 10 has moved by 1 cm to reach a first survey position, results of measurement by a distance measuring device 16 and a rotary encoder 18 are input to a control device 21. That is, first a value of angle u(1) at the first survey position is obtained. In this case, since known height data at the immediately preceding survey position of y(0)=, . . . ,=y(−49)=0 based on the initial value, the control device 21 calculates height data y(1) at the first survey position according to the above-mentioned equation 14 using the IIR filter operation method. Hereinafter, each time the measurement block 10 moves by 1 cm, similarly height data y(2), y(3), , y(49), and y(50) at respective survey positions are obtained sequentially by the control device 21.

Figure 9:
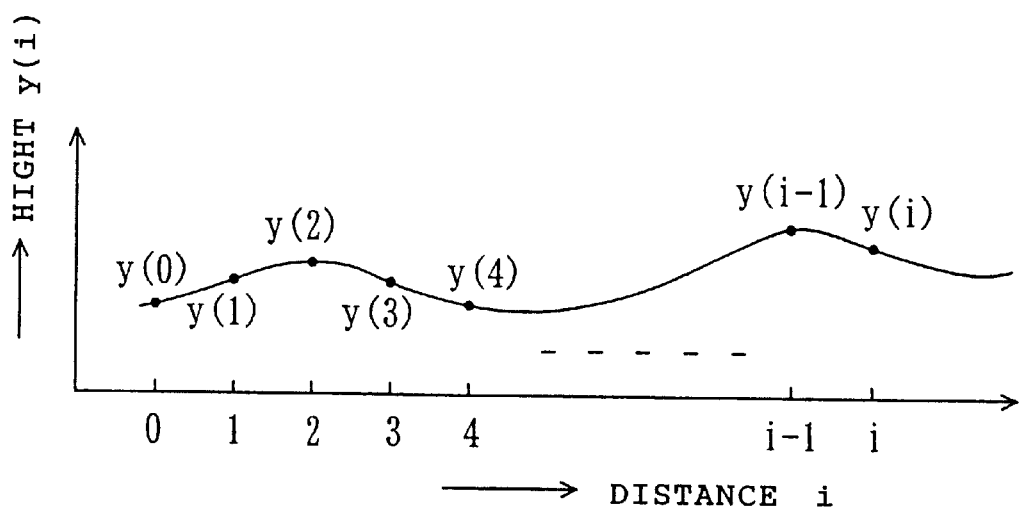
FIG. 9 is an illustration for explaining a relationship between an irregularity condition and data of a height at each survey position within the reference distance.

That is, while the measurement block 10, after starting from the starting point G, is passing through a reference distance of 50 cm calculated as a longitudinal distance of a road surface, each time the leasing third roller 13 reaches the survey positions sequentially, a displacement angle between the first and second coupling rods 14 and 15 is detected at each of the survey positions by the rotary encoder 18. Having received an output from the distance measuring device 16 and a detected displacement angle value u(i) from the rotary encoder 18, the control device 21 can use the known height data of the immediately preceding survey positions measured by the measurement block 10 to calculate height data at the current survey position based on the above-mentioned operation equation 14. Then, by combining height data y(i) of each of the survey positions with it, it is possible to precisely obtain a unit road surface profile within the reference distance for each of the short pitches between the survey positions as shown in FIG. 9. By consecutively integrating the unit road surface profiles thus obtained within the reference distance in the entire longitudinal direction of the road surface, a precise longitudinal profile of the road surface as a whole can be obtained.

As a result, by the present embodiment, data of precise irregularities of a road surface can be obtained for each of the short pitches between the survey positions into which the reference distance is divided, so that it is possible to accurately detect irregularities in the entire road surface including small irregular objects such as a structure joint, a concrete bond, and a pot-hole which are present on the road surface as a whole. Furthermore, the road surface profile thus obtained can be utilized in road step management etc.

Furthermore, a precise result of the flatness of the above-mentioned longitudinal profile can be obtained rapidly by assuming height y(i)=f(i) and using a method shown in FIG. 6 or that shown in FIG. 7.

Figure 10:
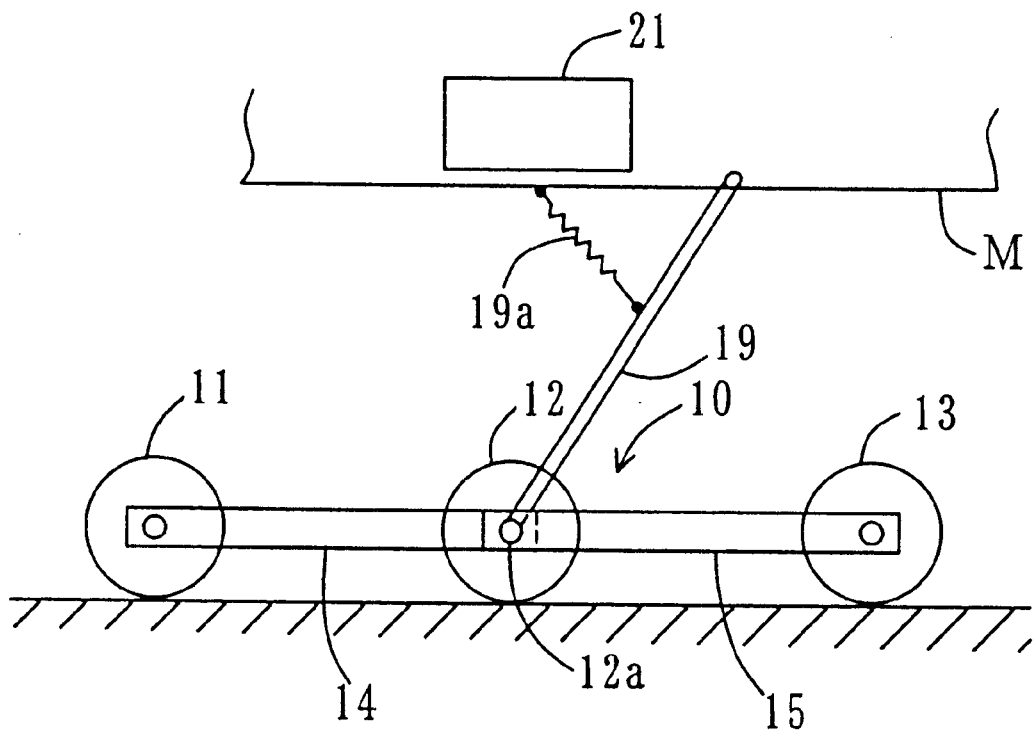
FIG. 10 is a front view for outlining a measurement block mounted to a measurement vehicle according to a modification.
Figure 11:
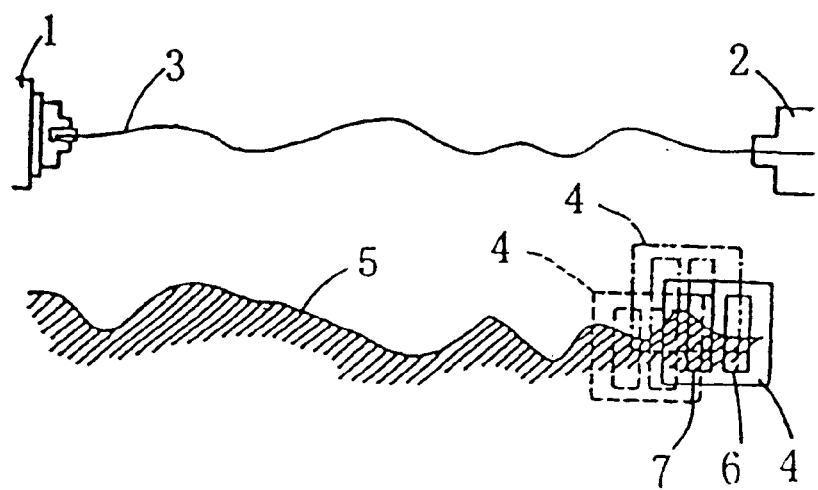
FIG. 11 is an illustration for explaining a method for surveying flatness of a road surface using the sequential-two-points method according to a conventional example.

Although the above-mentioned embodiments have calculated a longitudinal profile and height data using the control device 21 mounted on the measurement vehicle M based on a detected angle value at the survey positions etc., the present invention is not limited thereto; for example, only survey data may be obtained on the measurement vehicle M so that the longitudinal profile and the height data can be calculated at a different position based on the survey data. Furthermore, the distance measuring device 16 is not limited in configuration to the above-mentioned embodiments nor limited in mounting position to the coupling rod. Furthermore, the angle detection means is not limited to a rotary encoder and may come in similar detection means. Furthermore, instead of revolving each rotary shaft in the above-mentioned measurement block 10, each roller may be revolved around each corresponding roller. Furthermore, although as for the measurement block 10 mounted on the above-mentioned measurement vehicle M, one end of the coupling support rod 19 has been attached to the first coupling rod 14, the present invention is not limited thereto; in fact, in a variant, the one end of the coupling support rod 19 may be attached to each rotary shaft, especially to the second rotary shaft 12a as shown in FIG. 10.

Although in the above-mentioned second embodiment, the first and second coupling rods 14 and 15 of the measurement block 10 have the same length, they need not be of the same length and may have different lengths. Furthermore, in the second embodiment, as the filter operation method, the above-mentioned Infinite Impulse Response (IIR) filter operation method may be replaced by the Fast Fourier Transform method etc. Furthermore, the specific configuration of the measurement block is not limited to the above-mentioned embodiments. The above-mentioned embodiments give one example, so that it can be variously modified without departing from the gist of the present invention.

As mentioned above, a longitudinal road surface profile measurement method related to the present invention is suitable for surveying longitudinal road surface flatness of a road easily and accurately, so that the road surface profile thus obtained can be utilized in step management etc. of the road.

What is claimed is:

1. A longitudinal road surface profile measurement method for surveying a longitudinal irregularity condition in a road surface while moving a measurement vehicle longitudinally on a road, comprising the steps of:

arranging first, second, and third disk-shaped rollers having the same outer diameter so that the rollers have a predetermined spacing therebetween on the same straight line and rotate in the same straight-line direction;

using a measurement block constituted of a first predetermined-length coupling rod which is mounted on rotary shafts of the first and second rollers to couple the first and second rollers in a revolving manner, a second coupling rod which is mounted on rotary shafts of the second and third rollers to couple the second and third rollers in a revolving manner, distance measurement means which measures a movement distance of the rollers, and angle detection means which detects a displacement angle by which the first and second coupling rods have revolved from a straight state thereof, to elastically attach the measurement block to a measurement vehicle with a coupling member so as to be urged against the road surface;

deciding a plurality of survey positions obtained as a result of dividing into a plurality of pitches a reference distance which is defined as a center-to-center dimension between the first and third rollers in a condition where the first and second coupling rods are in a straight state;

each time the leading roller reaches the survey positions sequentially in an advancing direction in which the measurement block moves over the reference distance in a longitudinal direction of the road surface, detecting a displacement angle between the first and second coupling rods at each of the survey positions using the angle detection means;

calculating height data of the road surface at each of the survey positions using a filter operation method based on the detected displacement angle value obtained by the angle detection means and known height data at each of the immediately preceding survey positions measured by the measurement block, to obtain a unit road surface profile over the reference distance; and integrating the consecutive unit road surface profiles in the entire longitudinal direction of the road surface, to create a longitudinal profile of the road surface.

2. The longitudinal road surface profile measurement method according to claim 1, wherein the filter operation method is the infinite impulse response filter operation method.

3. A longitudinal road surface profile measurement method for surveying longitudinal flatness of a road surface by moving a measurement vehicle on a road longitudinally, comprising the steps of:

arranging first, second, and third disk-shaped rollers having the same outer diameter so that the rollers have a predetermined spacing therebetween on the same straight line and rotate in the same straight-line direction;

using a measurement block constituted of a first predetermined-length coupling rod which is mounted on rotary shafts of the first and second rollers to couple the first and second rollers in a revolving manner, a second coupling rod which has the same length as the first coupling rod and which is mounted on rotary shafts of the second and third rollers to couple the second and third rollers in a revolving manner, distance measurement means which measures a movement distance of the rollers, and angle detection means which detects a displacement angle by which the first and second coupling rods have revolved from a straight state thereof, to elastically couple the measurement block to the measurement vehicle with a coupling member so that the measurement block may be urged against the road surface;

detecting, using the angle detection means, a displacement angle between the first and second coupling rods each time the measurement block moves by one pitch, which is a center-to-center distance between the rollers, in a longitudinal direction of the road surface as the measurement vehicle moves, to create a longitudinal profile of the road surface based on detected angle values; wherein, a measuring instrument constituted of three probes aligned in parallel with each other with a predetermined spacing therebetween is moved in a unit of the predetermined spacing along said longitudinal profile in a condition where the probes on both sides of the measuring instrument are kept in contact with the longitudinal profile, to obtain a deflection dimension of the intermediate probe of the measuring instrument with respect to the longitudinal profile for each of the movement units in order to calculate a standard deviation of a measured value of the deflection dimension, thus providing flatness of a road surface.

4. A longitudinal road surface profile measurement method for surveying longitudinal flatness of a road surface by moving a measurement vehicle on a road longitudinally, comprising the steps of:

arranging first, second, and third disk-shaped rollers having the same outer diameter so that the rollers have a predetermined spacing therebetween on the same straight line and rotate in the same straight-line direction;

using a measurement block constituted of a first predetermined-length coupling rod which is mounted on rotary shafts of the first and second rollers to couple the first and second rollers in a revolving manner, a second coupling rod which has the same length as the first coupling rod and which is mounted on rotary shafts of the second and third rollers to couple the second and third rollers in a revolving manner, distance measurement means which measures a movement distance of the rollers, and angle detection means which detects a displacement angle by which the first and second coupling rods have revolved from a straight state thereof, to elastically couple the measurement block to the measurement vehicle with a coupling member so that the measurement block may be urged against the road surface;

detecting, using the angle detection means, a displacement angle between the first and second coupling rods each time the measurement block moves by one pitch, which is a center-to-center distance between the rollers, in a longitudinal direction of the road surface as the measurement vehicle moves, to create a longitudinal profile of the road surface based on detected angle values; and, moving a measuring instrument constituted of a dead-weight having a predetermined weight attached to one end of a linear spring material having a predetermined spring constant longitudinally at a predetermined speed in a condition where the linear spring material is poised as erected with the deadweight as arranged at an upper end thereof and a lower end thereof is kept in contact with said longitudinal profile;

integrating vertical displacements of the deadweight during the movement; and calculating an integrated value of the displacements, thus providing flatness of the road surface.

* * * * *